(12) United States Patent
Iso (10) Patent No.: US 7,841,791 B2
(45) Date of Patent: Nov. 30, 2010

(54) KEYBOARD, LIGHTING MODULE FOR KEYBOARD AND ELECTRONIC APPARATUS

(75) Inventor: Kageyuki Iso, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/604,182

(22) Filed: Oct. 22, 2009

(65) Prior Publication Data

US 2010/0128427 A1 May 27, 2010

(30) Foreign Application Priority Data

Nov. 27, 2008 (JP) .............................. 2008-302799

(51) Int. Cl.
G06F 3/023 (2006.01)
(52) U.S. Cl. ..................... 400/491.2; 400/490; 400/472
(58) Field of Classification Search ................. 400/490, 400/491.2, 493
See application file for complete search history.

(56) References Cited

U.S. PATENT DOCUMENTS

| | | | | |
|---|---|---|---|---|
| 5,128,842 | A * | 7/1992 | Kenmochi | 362/95 |
| 7,388,167 | B2 * | 6/2008 | Liao et al. | 200/310 |
| 7,525,056 | B2 | 4/2009 | Chiba et al. | |
| 7,608,792 | B1 * | 10/2009 | Tsai | 200/310 |
| 7,683,279 | B2 * | 3/2010 | Kim | 200/310 |
| 2004/0174331 | A1 * | 9/2004 | Su et al. | 345/102 |
| 2007/0235306 | A1 | 10/2007 | Chiba et al. | |
| 2009/0103964 | A1 | 4/2009 | Takagi et al. | |

FOREIGN PATENT DOCUMENTS

| | | | |
|---|---|---|---|
| JP | 04-329229 | | 11/1992 |
| JP | 06076684 A | * | 3/1994 |
| JP | 2002-170458 | | 6/2002 |
| JP | 2002-260478 | | 9/2002 |
| JP | 2004-022374 | | 1/2004 |
| JP | 2004-022378 | | 1/2004 |
| JP | 2004-031031 | | 1/2004 |
| JP | 2004-235038 | | 8/2004 |
| JP | 2005-032703 | | 2/2005 |
| JP | 3126458 | | 10/2006 |
| JP | 2006-338972 | | 12/2006 |
| JP | 2007-280810 | | 10/2007 |
| JP | 2007305313 A | * | 11/2007 |
| JP | 2008-235065 | | 2/2008 |
| JP | 2008071735 A | * | 3/2008 |
| JP | 2009-099386 | | 5/2009 |
| WO | WO 2007132968 A1 | * | 11/2007 |

* cited by examiner

*Primary Examiner*—Daniel J Colilla
(74) *Attorney, Agent, or Firm*—Blakely, Sokoloff, Taylor & Zafman LLP (57) ABSTRACT

According to one embodiment, a keyboard includes keytops supported on a substrate and a membrane switch placed between the keytops and the substrate. The membrane switch has an electrically insulating membrane sheet on which a plurality of contacts operated by the keytops are formed. A light source is mounted on the membrane sheet. A conductor pattern configured to supply an electric current to the light source is formed on the membrane sheet. Further, a lightguide plate configured to lead light emitted by the light source to the keytops is stacked on the membrane sheet.

8 Claims, 7 Drawing Sheets

KEYBOARD, LIGHTING MODULE FOR KEYBOARD AND ELECTRONIC APPARATUS

CROSS-REFERENCE TO RELATED APPLICATIONS

This application is based upon and claims the benefit of priority from Japanese Patent Application No. 2008-302799, filed Nov. 27, 2008, the entire contents of which are incorporated herein by reference.

BACKGROUND

1. Field

One embodiment of the invention relates to a keyboard having glowing keytops, and a lighting module for a keyboard in which a light source is incorporated into a membrane switch operated by keytops. The embodiment of the invention also relates to an electronic apparatus such as a portable computer having a glowing keyboard.

2. Description of the Related Art

A portable computer, which is an example of an electronic apparatus, is equipped with a keyboard via which information such as numbers and letters is manually input by the operator. The keyboard includes a plurality of keytops and a membrane switch. The membrane switch has a plurality of fixed contacts and a plurality of movable contacts. The fixed contacts and the movable contacts each correspond to the keytops.

When the operator depresses a desired keytop with a fingertip of his/her hand, a fixed contact and a movable contact corresponding to the depressed keytop contact each other, and the membrane switch is closed. Thereby, an input signal indicating that the keytop has been pressed is sent to a keyboard controller from the membrane switch.

When the operator operates the keyboard in a dark environment or a dim room where enough illumination light is not provided, it makes it hard for the operator to recognize the keytop that should be operated. This worsens the operability of the keyboard, which can become a cause of an input error.

To improve this, in a keyboard disclosed by Jpn. Pat. Appln. KOKAI Publication No. 2002-260478, for example, a light-emitting means for lighting up keytops is provided below the keytops. A conventional light-emitting means is formed of a backlight sheet having a light-emitting diode.

The backlight sheet includes a lightguide plate having a light-diffusing layer, and a reflective sheet laminated on the lower surface of the lightguide plate. The light-emitting diode as a light source is mounted at one end of the lightguide plate.

The backlight sheet is laminated on the lower surface of a substrate supporting the membrane switch and the keytops. The light emitted by the light-emitting diode travels in the lightguide plate while being repeatedly reflected, and is emitted through the light-diffusing layer and the reflective sheet from the upper surface of the lightguide plate.

The light emitted from the upper surface of the lightguide plate penetrates the substrate and the membrane switch of the keyboard, and is led to the keytops. The keytop has optical transparency at least in the letter part indicating the function of the keytop. Therefore, a part of light emitted toward the keytop from the lightguide plate penetrates the letter part of the keytop, and thereby the letter glows.

As a result, the operator can recognize the kind and the function of the keytop even in darkness or a dim environment. This prevents erroneous operations of the keyboard.

In a conventional backlight sheet, a light-emitting diode is mounted at one end of a lightguide plate. Such a configuration requires an exclusive wiring part such as a flexible printed wiring board supplying an electric current from a power supply to the light-emitting diode. This increases the number of parts forming a keyboard, and the cost of the keyboard. Furthermore, since the backlight sheet is laminated on the lower surface of a substrate of the keyboard, it cannot be avoided that the backlight sheet projects into the lower part of the keyboard. This results in increase in overall thickness of the keyboard including the backlight sheet. Therefore, a recent demand for forming a keyboard flatly and compactly cannot be satisfied.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a keyboard comprises a substrate; a plurality of keytops supported on the substrate; and a membrane switch placed between the keytops and the substrate, the membrane switch having an electrically insulating membrane sheet on which a plurality of contacts operated by the keytops are formed.

A light source is mounted on the membrane sheet of the membrane switch. A conductor pattern configured to supply an electric current to the light source is formed on the membrane sheet. Further, a lightguide configured to lead light emitted by the light source to the keytops is stacked on the membrane sheet.

Hereinafter, a first embodiment of the invention will be described with reference to FIGS. 1 to 6.

Figure 1:
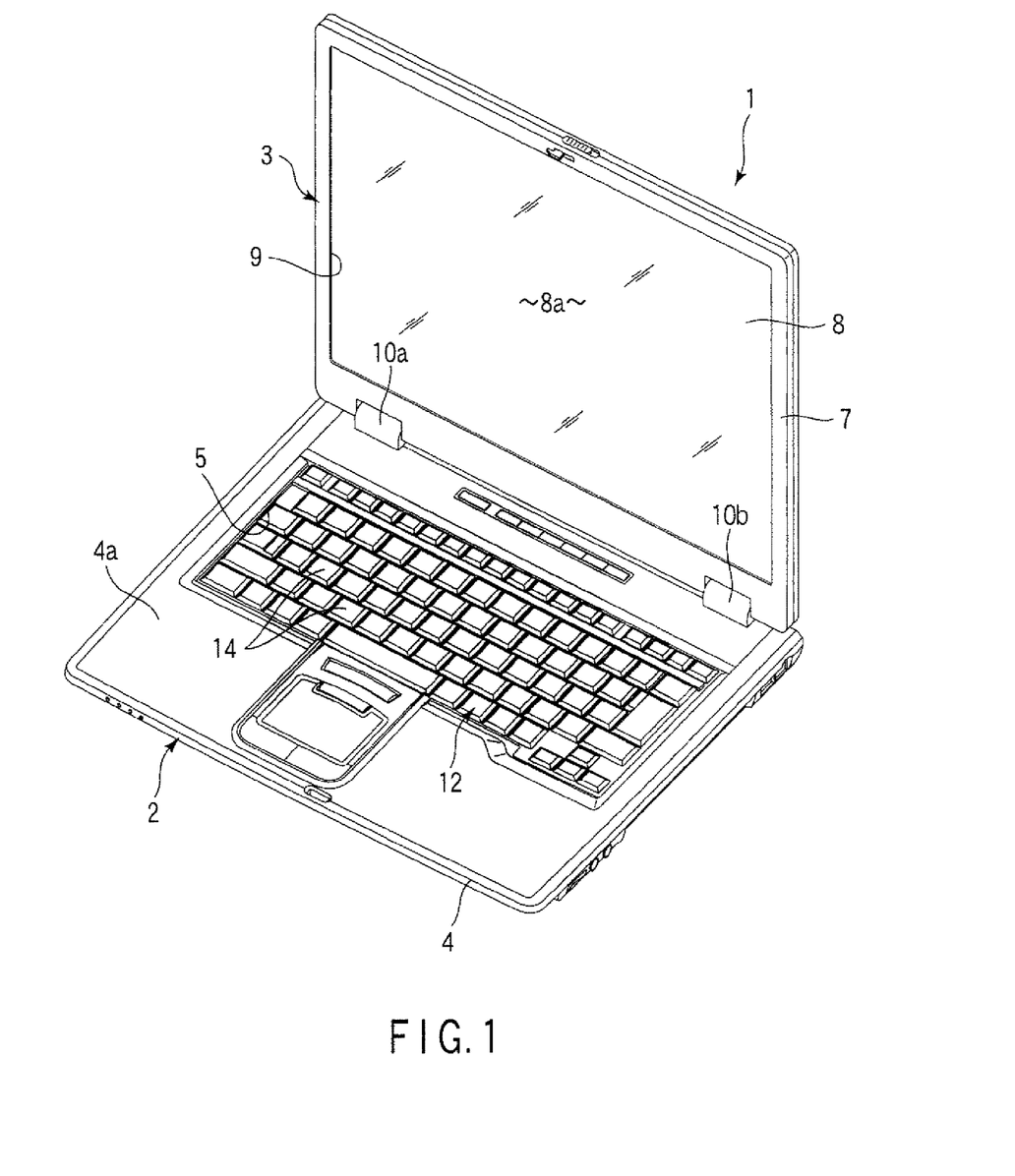
FIG. 1 is a perspective view of an exemplary portable computer according to a first embodiment of the invention.
Figure 2:
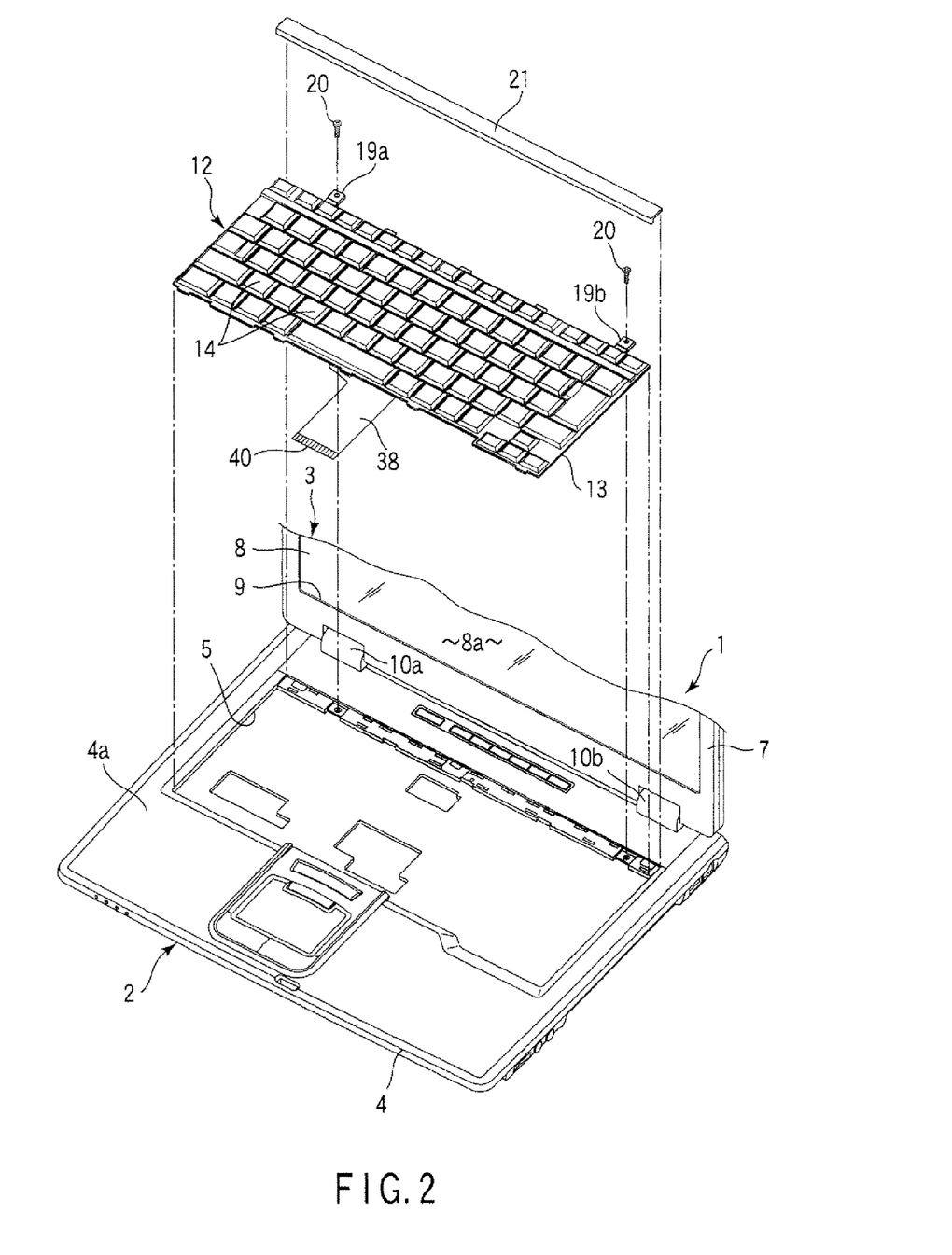
FIG. 2 is an exemplary perspective view of the portable computer illustrating a state in which a keyboard is removed from a housing according to the first embodiment of the invention.

FIGS. 1 and 2 disclose a portable computer 1, which is an example of an electronic apparatus. The portable computer 1 comprises a computer main module 2 and a display module 3.

The computer main module 2 has a flat box-shaped housing 4. The housing 4 contains main structural elements such as a print circuit board on which a CPU is mounted and a hard disk drive, for example. The housing 4 has a flat upper surface 4a. A keyboard mount area 5 is formed in a central part of the upper surface 4a of the housing 4.

The display module 3 includes a flat box-shaped display housing 7 and a liquid crystal display panel 8 contained in the display housing 7. The liquid crystal display panel 8 has a screen 8a. The screen 8a is exposed outside the display module 3 from an opening 9 which is made the front surface of the display housing 7.

The display module 3 is supported by a pair of hinge parts 10a and 10b projecting from the rear end of the housing 4. The display module 3 is rotatable on the hinge parts 10a and 10b between a closed position and an open position. In the closed position, the display module 3 lies on the computer main module 2. In the open position, the display module 3 stands up from the rear end of the computer main module 2.

Figure 3:
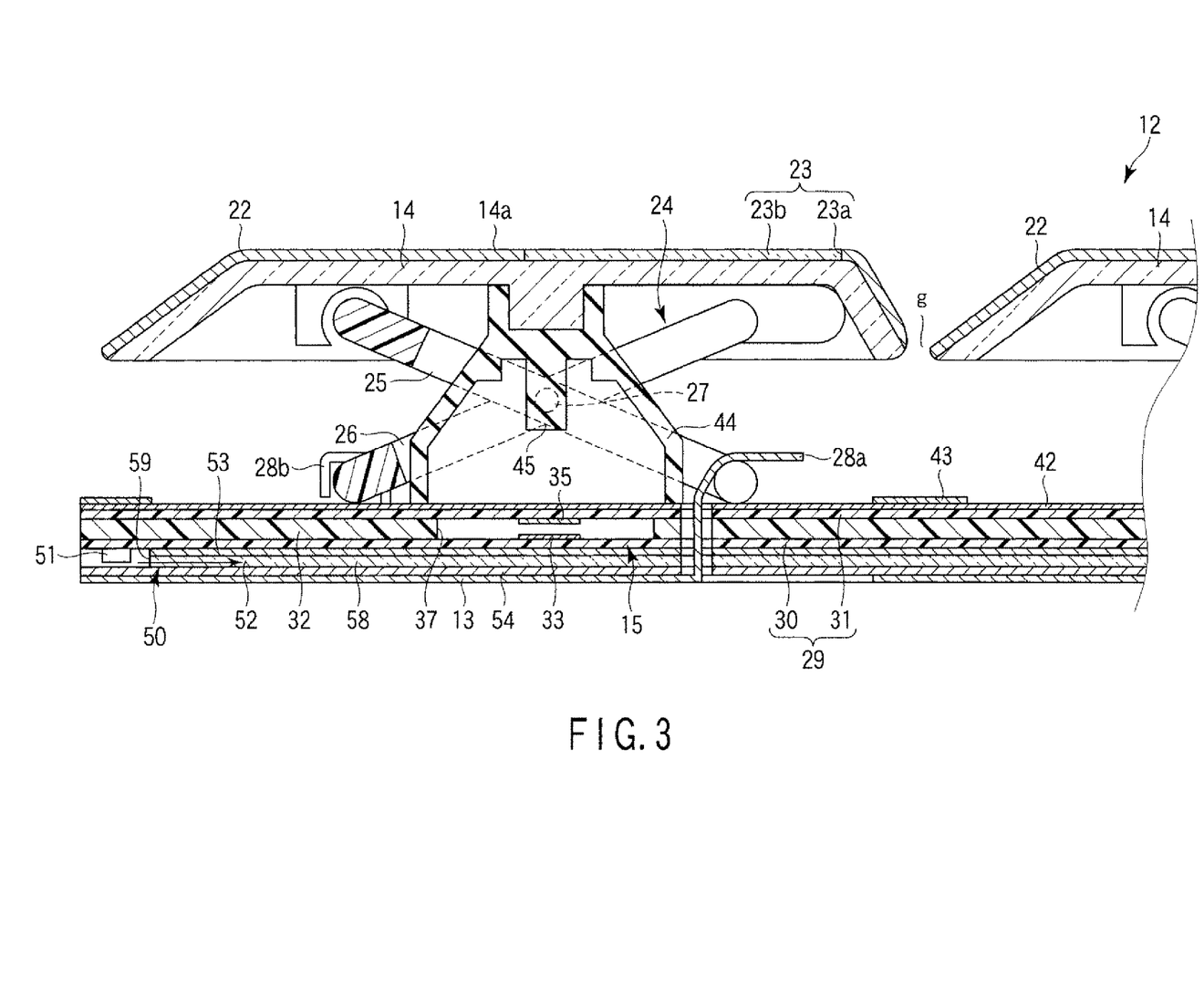
FIG. 3 is an exemplary cross section of a keyboard according to the first embodiment of the invention.
Figure 4:
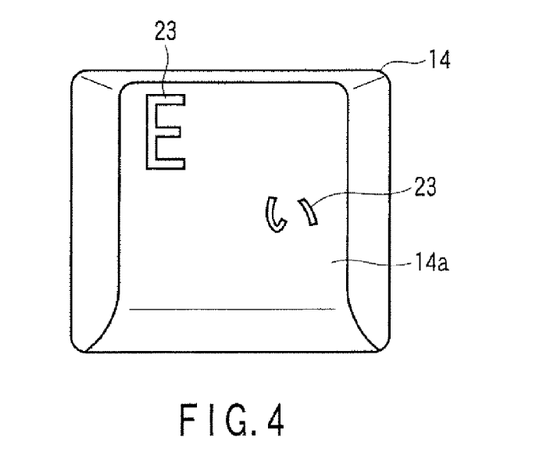
FIG. 4 is an exemplary plan view of a keytop according to the first embodiment of the invention.

A keyboard 12 is supported by the keyboard mount area 5 of the housing 4. As shown in FIGS. 2 and 3, the keyboard 12 includes a substrate 13, a plurality of keytops 14 and a membrane switch 15.

The substrate 13 is formed of a metal plate subjected to sheet metal stamping, for example. The substrate 13 has a flat shape that fits into the keyboard mount area 5. The substrate 13 has a front-end edge and a rear-end edge extending in the width direction of the housing 4. The front-end edge of the substrate 13 is caught in the keyboard mount area 5. A pair of tongues 19a and 19b are formed on the rear-end edge of the substrate 13. Each of the tongues 19a and 19b projects into the rear side of the substrate 13, and is fixed to the keyboard mount area 5 with a screw 20. The tongues 19a and 19b and the screws 20 are covered with a belt-like cover 21.

The keytops 14 are formed of a transparent or semitransparent synthetic resinous material having optical transparency. The keytops 14 are arranged on the substrate 13 in a matrix according to a rule defined in advance. According to the embodiment, a top surface of the keytop 14 is covered with a film 22 having a light blocking effect, for example.

Each of the keytops 14 has a rectangular press surface 14a of a size that can be pressed with a fingertip of a hand. As typified by a letter key shown in FIG. 4, two indication parts 23 indicating the function and the kind of the keytop 14 by means of a letter is formed on the press surface 14a of the keytop 14.

As shown in FIG. 3, the indication part 23 is defined by a slit 23a formed in the film 22 and an optically transparent resin material 23b charged into the slit 23a. The slit 23a, formed by subjecting the film 22 to laser processing, and has a shape corresponding to a character. It is desirable that the resin material 23b has a color different from that of the film 22.

As shown in FIG. 3, each of the keytops 14 is supported by a pantograph-type keytop support mechanism 24 on the substrate 13. The keytop support mechanism 24 includes a first link lever 25 and a second link lever 26.

Each of the first and second link levers 25 and 26 is formed of a transparent or semitransparent synthetic resinous material having optical transparency. The first link lever 25 and the second link lever 26 intersect in the shape of an X, and coupled with each other at the intersection part via a pivot axis 27.

One end of the first link lever 25 is rotatably coupled with the front part of the back surface of the keytop 14. The other end of the first link lever 25 is slidably supported by a first latch piece 28a protruding upward from the substrate 13.

Similarly, one end of the second link lever 26 is slidably supported by the rear part of the back surface of the keytop 14. The other end of the second link lever 26 is rotatably supported by a second latch piece 28b projecting upward from the substrate 13.

Thereby, the first link lever 25 and the second link lever 26 are relatively rotatable in a vertical direction about the pivot axis 27, and liftably support the keytop 14 to the substrate 13. Accordingly, the keytop 14 moves up and down between a standby position in which the keytop 14 is pressed up from the substrate 13 and a depressed position in which the keytop 14 sinks toward the substrate 13.

The membrane switch 15 is designed to electrically detect an operation of depressing the keytops 14 and put out an input signal. The membrane switch 15 is placed between the substrate 13 and the keytops 14.

The membrane switch 15 includes a membrane sheet 29. The membrane sheet 29 is a flexible electrically insulating film having optical transparency, and is stacked on the substrate 13. The membrane sheet 29 has a first sheet 30 and a second sheet 31. The first and second sheets 30 and 31, which have the same shape, are stacked on each other with an insulating spacer 32 interposed in between. An optically transparent film is used as the insulating spacer 32.

Figure 5:
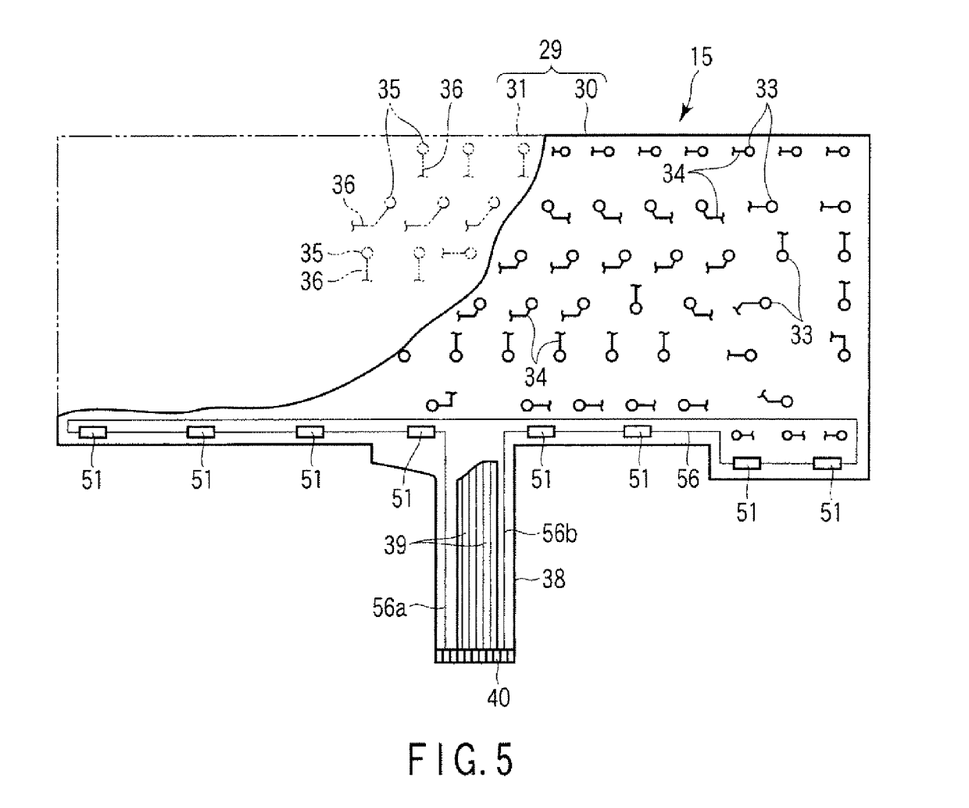
FIG. 5 is an exemplary plan view of a membrane switch according to the first embodiment of the invention.

As shown in FIG. 3 and FIG. 5, a plurality of fixed contacts 33 and a plurality of conductor patterns 34 are printed on the first sheet 30. The fixed contacts 33 are arranged in a matrix so as to correspond to the keytops 14. The conductor patterns 34 are electrically connected to the fixed contacts 33.

A plurality of movable contacts 35 and a plurality of conductor patterns 36 are formed on the second sheet 31. The movable contacts 35 are arranged in a matrix so as to correspond to the keytops 14, and are located immediately above the fixed contacts 33. The conductor patterns 36 are electrically connected to the movable contacts 35.

The fixed contact 33 and the movable contact 35 face each other in a through-hole 37 formed in the insulating spacer 32, and are located immediately below the keytop 14. The insulating spacer 32 maintains a distance between the fixed contact 33 and the movable contact 35 constant.

As shown in FIGS. 2 and 5, the membrane sheet 29 has a strip-shaped lead piece 38. The lead piece 38 is drawn out outside the keyboard 12 from the front edge of the membrane sheet 29.

The lead piece 38 has a plurality of signal patterns 39 and a terminal part 40. The signal patterns 39 are electrically connected to the conductor patterns 34 and 36. The terminal part 40 is located at a tip of the lead piece 38, and is electrically connected to the signal patterns 39. The lead piece 38 is led to the inside of the housing 4 from the keyboard mount area 5. The terminal part 40 of the lead piece 38 is connected to a keyboard connector (not shown) located inside the housing 4.

As shown in FIG. 3, a protective sheet 42 is stacked on the second sheet 31 of the membrane sheet 29. The protective sheet 42, which is an optically transparent film, for example, faces the back surface of the keytop 14 and the keytop support mechanism 24. The other end of each of the first and second link levers 25 and 26 of the keytop support mechanism 24 contacts the protective sheet 42.

A light-blocking layer 43 is stacked on the protective sheet 42. The light-blocking layer 43 is in the shape of a grid in which areas corresponding to the plurality of keytops 14 are hollowed out. Accordingly, the light-blocking layer 43 is located immediately below a gap g between adjacent keytops 14.

As shown in FIG. 3, an optically transparent rubber spring 44 in the form of a pipe is interposed between the keytop 14 and the protective sheet 42. The rubber spring 44 elastically presses up the keytop 14 toward the standby position at all times. The rubber spring 44 has a press projection 45 projecting downward from the upper-end portion of the rubber spring 44. The press projection 45 is located immediately above the movable contact 35 of the membrane switch 15.

When the operator depresses a desired keytop 14 with a fingertip of his/her hand, the first and second link levers 25 and 26 rotates downward, resisting an urging force of the rubber spring 44. At the same time, the rubber spring 44 is compressed, and the press projection 45 presses the second sheet 31 of the membrane switch 15 downward via the protective sheet 42.

Thereby, the second sheet 31 is bent and the movable contact 35 is pressed against the fixed contact 33. As a result, the operation of depressing the keytop 14 is electrically detected, and an input signal is sent to a keyboard controller from the membrane switch 15.

When the depression of the keytop 14 is released, the keytop 14 is pushed up from the depressed position to the standby position by an urging force of the rubber spring 44. At the same time, the press projection 45 of the rubber spring 44 is separated from the second sheet 31. Thereby, the second sheet 31 returns to its original shape by its own restoring force, and the movable contact 35 is separated from the fixed contact 33. Accordingly, the fixed contact 33 and the movable contact 35 of the membrane switch 15 are operated by the keytop 14.

As shown in FIG. 3, a lighting module 50 lighting up the keytops 14 is incorporated in the keyboard 12. The lighting module 50 includes a plurality of light-emitting diodes 51, a lightguide plate 52, a light-diffusing plate 53 and a light-reflecting plate 54.

The light-emitting diode 51 is an example of a light source, and is mounted on the lower surface of the first sheet 30 of the membrane sheet 29. As best shown in FIG. 5, the light-emitting diodes 51 are arranged at intervals in the width direction of the membrane sheet 29 at the front-end part of the lower surface of the first sheet 30. Accordingly, the light-emitting diode 51 is located below a front-row keytop 14, and emits light toward the lower side of a backmost keytop 14.

A conductor pattern 56 is formed on the first sheet 30 of the membrane sheet 29. The conductor pattern 56 extends in the width direction of the membrane sheet 29, and connects in series the plurality of light-emitting diodes 51.

Further, the conductor pattern 56 has a plus-side power source line 56a and a minus-side power source line 56b. The plus-side power source line 56a and the minus-side power source line 56b are led to the lead piece 38 of the membrane sheet 29, and are electrically connected to the terminal part 40 of the lead piece 38. Accordingly, when the terminal part 40 of the lead piece 38 is connected to the keyboard connector, the conductor pattern 56 on the membrane sheet 29 is electrically connected to a battery (not shown) provided in the computer main module 2.

The lightguide plate 52, which is an example of a lightguide, has a sheet-like main body 58. The main body 58 is formed of a synthetic resinous material having optical transparency, for example. The main body 58 has a size corresponding to that of the substrate 13 of the keyboard 12.

The main body 58 of the lightguide plate 52 is placed between the substrate 13 and the membrane switch 15. The main body 58 has an incident plane 59 at the front end thereof. The incident plane 59 faces the light-emitting diode 51 on the substrate 13. In other words, the light-emitting diodes 51 are arranged at intervals along the front-end part, which is an outer peripheral part of the main body 58.

Accordingly, light emitted by the light-emitting diode 51 is incident on the inside of the main body 58 of the lightguide plate 52 from the incident plane 59. The light incident on the main body 58 passes through the inside of the lightguide 52 from the front end toward the rear end of the keyboard 12 while being repeatedly reflected off the top surface and the back surface of the main body 58.

As shown in FIG. 3, the light-diffusing plate 53 is stacked on the top surface of the main body 58 of the lightguide plate 52, and is interposed between the main body 58 and the first sheet 30 of the membrane sheet 29. The light-diffusing plate 53 is formed of a synthetic resinous material having optical transparency, for example. The light-diffusing plate 53 has a size approximately same as that of the main body 58.

Figure 6:
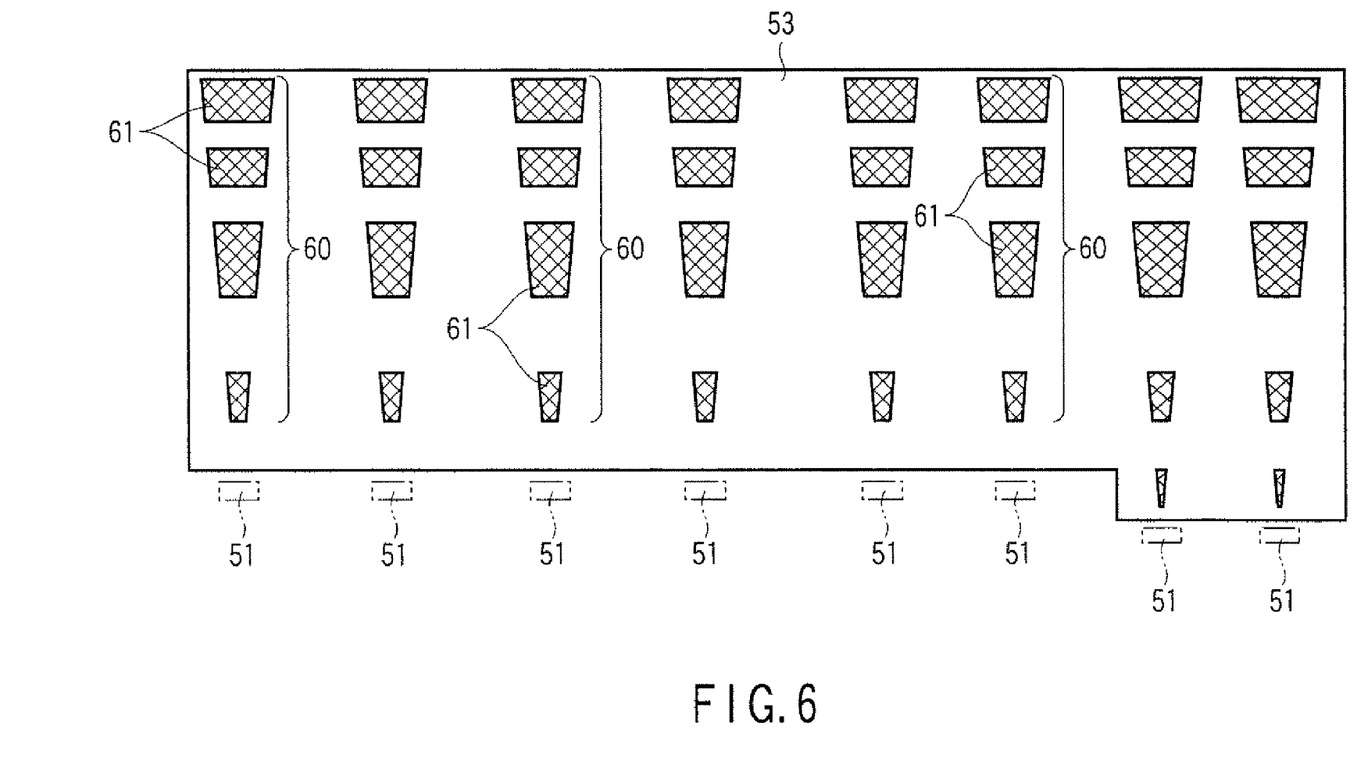
FIG. 6 is an exemplary plan view of a light-diffusing plate according to the first embodiment of the invention.

As shown in FIG. 6, the light-diffusing plate 53 includes a plurality of light-diffusing parts 60. The light-diffusing parts 60 are arranged at intervals in the width direction of the keyboard 12 so as to correspond to the position of the light-emitting diodes 51, for example. Each of the light-diffusing parts 60 has a plurality of patterns 61. The patterns 61 are designed to diffuse light that penetrates the light-diffusing plate 53 in a thickness direction. According to the embodiment, the patterns 61 are printed on at least one of a top surface and a back surface of the light-diffusing plate 53 so as to be arranged at intervals in a depth direction of the keyboard 12.

Further, the patterns 61 of each of the light-diffusing parts 60 are configured such that the pattern 61 increases in planar dimension as the distance from the light-emitting diode 51 increases. Accordingly, a pattern 61 farthest from the light-emitting diode 51 has a characteristic of diffusing light more widely and efficiently than a pattern 61 adjacent to the light-emitting diode 51.

As shown in FIG. 3, the light-reflecting plate 54 is stacked on the back surface of the main body 58 of the lightguide plate 52, and is interposed between the main body 58 and the substrate 13. The light-reflecting plate 54 is designed to let light passing through the inside of the main body 58 of the lightguide plate 52 reflect toward the keytops 14, and is colored white, for example.

According to the portable computer 1 with the above-described configuration, the light-emitting diodes 51 of the lighting module 50 are connected to the battery via the conductor pattern 56 formed on the membrane sheet 29. Accordingly, the light-emitting diode 51 emits light when an electric current is supplied to the light-emitting diode 51 from the battery via the conductor pattern 56.

As shown in FIG. 3 by an arrow, the light emitted by the light-emitting diode 51 is incident on the inside of the main body 58 from the incident plane 59 of the lightguide plate 52. The light incident on the main body 58 passes through the inside of the main body 58, while being repeatedly reflected off the top surface and the back surface of the main body 58.

The light passing through the inside of the main body 58 reflects off the light-reflecting plate 54 toward the keytops 14. Further, the light traveling toward the keytops 14 interferes with the patterns 61 of the light-diffusing parts 60 in a process of passing through the light-diffusing plate 53 in a thickness direction. This interference diffuses light over a wide area of the light-diffusing plate 53.

The light-diffusing plate 53 has a characteristic of diffusing light more widely and efficiently as the light travels away from the light-emitting diode 51 toward a direction in which the light is radiated. Accordingly, even if the amount of light passing through the inside of the main body 58 of the lightguide plate 52 decreases as the light travels away from the light-emitting diode 51, the decrease in the amount of light may be compensated for by the light-diffusing action of the patterns 61. Therefore, unevenness of the amount of light penetrating the light-diffusing plate 53 and traveling toward the keytop 14 can be suppressed.

The light that has passed through the light-diffusing plate 53 penetrates the membrane sheet 29, the insulating spacer 32, the protective sheet 42, the keytop support mechanism 24 and the rubber spring 44, and is led to the back surface of the keytop 14.

The keytop 14 having optical transparency is covered with the film 22 having a light blocking effect, except for an area in which the indication part 23 forming a character is provided. Therefore, a part in which light penetrates in the keytop 14 is limited to the area in which the indication part 23 is provided. Accordingly, the light led to the back surface of the keytop 14 penetrates the resin material 23b, and is released above the keytop 14. Thereby, the indication part 23 of the keytop 14 glows.

As a result, the operator can easily recognize the function and the kind of the keytop 14 even in darkness or a dim environment, which prevents erroneous operations of the keyboard 12.

In the embodiment, the light-blocking layer 43 is stacked on the protective sheet 42 covering the membrane switch 15. The light-blocking layer 43 is located immediately below the gap g between adjacent keytops 14. Therefore, the light-blocking layer 43 blocks light that is going to penetrate the membrane switch 15 and the protective sheet 42 between the adjacent keytops 14. This prevents leakage of light from the gap g between the adjacent keytops 14, and clarifies existence of the glowing indication part 23.

According to the first embodiment of the invention, the light-emitting diodes 51 lighting up the keytops 14 are mounted on the membrane sheet 29 of the membrane switch 15. Further, the conductor pattern 56, which supplies an electric current to the light-emitting diodes 51, is formed in the membrane sheet 29. Therefore, the membrane sheet 29 also functions as a flexible printed wiring board, which eliminates the need for an exclusive wiring part that supplies an electric current to the light-emitting diodes 51.

Accordingly, with the configuration in which the lighting module 50 is integrally incorporated into the keyboard 12, the number of parts of the keyboard 12 and the cost of the keyboard 12 can be reduced.

In addition, the lightguide plate 52, which leads light to the keytop 14, the light-diffusing plate 53, and the light-reflecting plate 54 are provided on the substrate 13, which supports the keytop 14. Accordingly, the lightguide plate 52, the light-diffusing plate 53, and the light-reflecting plate 54 do not project below the keyboard 12.

In other words, the lightguide plate 52, the light-diffusing plate 53, and the light-reflecting plate 54 fit into a peculiar dead zone of the keyboard 12 generated between the substrate 13 and the keytops 14. This enables flattening of the keyboard 12 while adding the lighting module 50 to the keyboard 12.

The present invention is not limited to the above-described first embodiment and can be embodied with various modifications without departing from the scope of the invention.

Figure 7:
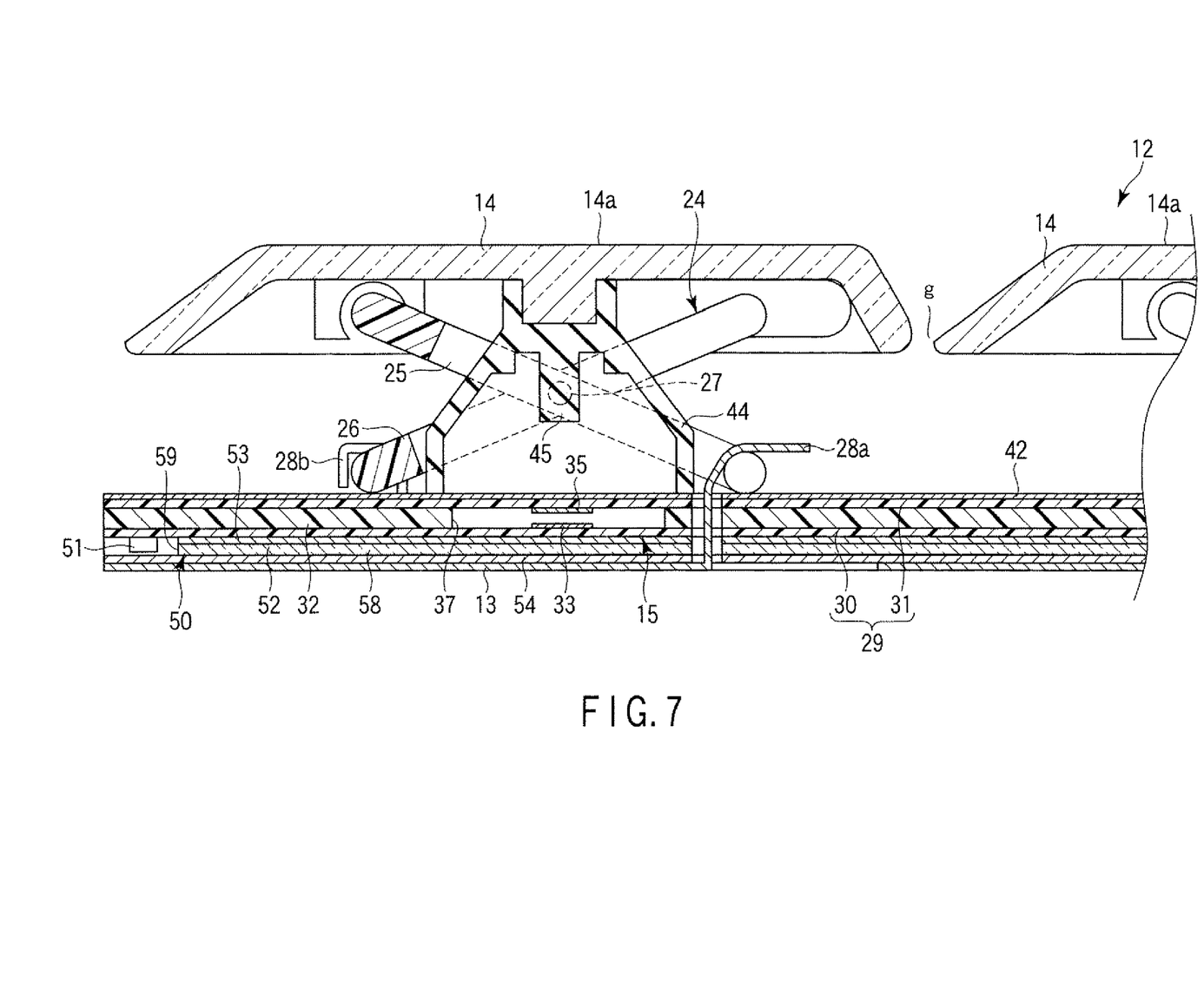
FIG. 7 is an exemplary cross section of a keyboard according to a second embodiment of the invention.

For example, FIG. 7 discloses a second embodiment of the invention.

The second embodiment differs from the first embodiment in that the entire surface of the press surface 14a of the keytop 14 glows. The other configurations of the keyboard 12 are same as those of the first embodiment. Accordingly, in the second embodiment, structural elements same as those of the first embodiment will be referred to by the same reference signs, and descriptions of such elements will be omitted.

As shown in FIG. 7, the press surface 14a of the keytop 14 having optical transparency is exposed outside the keyboard 12 without being covered with a film having a light blocking effect. A letter or a symbol indicating the kind and the function of the keytop 14 is formed on the press surface 14a of the keytop 14 by means of printing, for example.

When light emitted from the light-emitting diode 15 is led to the back surface of the keytop 14, the light penetrates the keytop 14 and reaches the press surface 14a. As a result, the entire surface of the press surface 14a glows, and the letter or the sign printed on the press surface 14a is lighted up. Accordingly, the function and the kind of the keytop 14 can be recognized easily even if the environment in which the keyboard 12 is operated is dark.

Figure 8:
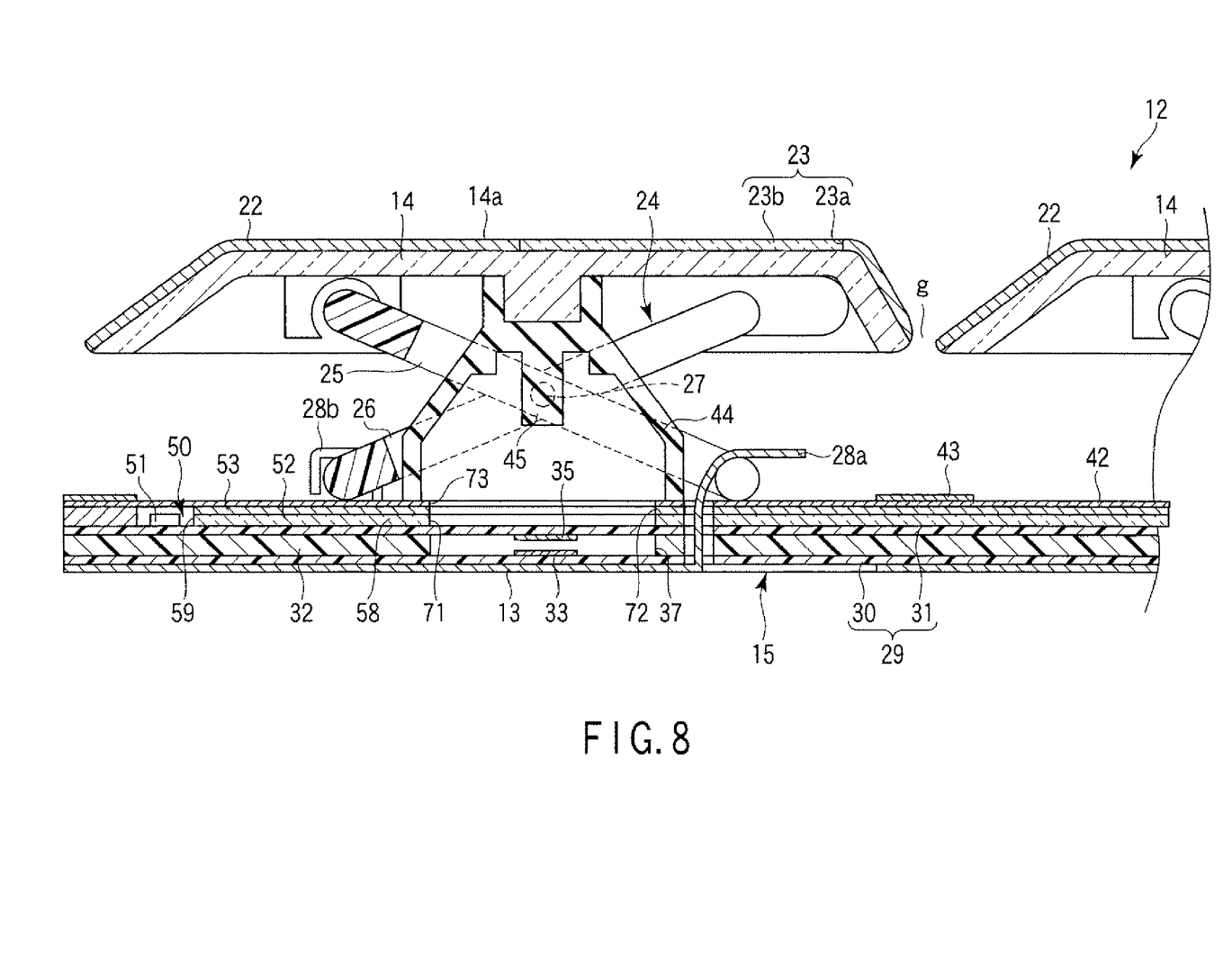
FIG. 8 is an exemplary cross section of a keyboard according to a third embodiment of the invention.

FIG. 8 discloses a third embodiment of the invention.

The third embodiment differs from the first embodiment in positional relationship between the membrane switch 15 and the lightguide plate 52. The other configurations of the keyboard 12 are same as those of the first embodiment. Therefore, in the third embodiment, the structural elements same as those of the first embodiment will be referred to by the same reference signs, and descriptions of such elements will be omitted.

As shown in FIG. 8, a membrane sheet 29 of the membrane switch 15 is stacked on a substrate 13 of the keyboard 12. A light-emitting diode 51 as a light source is mounted on the upper surface of a second sheet 31 of the membrane sheet 29. According to the embodiment, the light-emitting diodes 51 are arranged at intervals in the width direction of the membrane switch 15 in the front-end part of the upper surface of the second sheet 31.

The main body 58 of the lightguide plate 52 is stacked on the upper surface of the second sheet 31 of the membrane sheet 29. The main body 58 has a first through-hole 71 in a position corresponding to that of a movable contact 35 formed in the second sheet 31. The first through-hole 71 is located immediately below a press projection 45 of a rubber spring 44.

An incident plane 59 of the main body 58 faces the light-emitting diode 51 on the membrane sheet 29. The light emitted by the light-emitting diode 51 is incident on the inside of the main body 58 of the lightguide plate 52 from the incident plane 59. The light incident on the main body 58 passes through the inside of the main body 58, being repeatedly reflected off a top surface and a back surface of the main body 58.

The light-diffusing plate 53 is stacked on the top surface of the main body 58 of the lightguide plate 52, as in the case of the first embodiment. The light-diffusing plate 53 has a second through-hole 72. The second through-hole 72 agrees with the first through-hole 71 of the lightguide plate 52.

Further, a protective sheet 42 is stacked on the light-diffusing plate 53, and covers the light-diffusing plate 53. The protective sheet 42 has a third through-hole 73. The third through-hole 73 agrees with the second through-hole 72 of the light-diffusing plate 53. As a result, a part of the membrane sheet 29 having a movable contact 35 faces a press projection 45 of a rubber spring 44 through the first to third through-holes 71, 72 and 73.

According to the embodiment, the light emitted by the light-emitting diode 51 passes through the inside of the main body 58 of the lightguide plate 52 as in the case of the first embodiment, and is led to the back surface of the keytop 14 by a light-diffusing action of the light-diffusing plate 53. The light that has reached the back surface of the keytop 14 penetrates a resin material 23b of an indication part 23, and is released above the keytop 14. Thereby, the indication part 23 of the keytop 14 glows.

Accordingly, as in the case of the first embodiment, the operator can recognize the function and the kind of the keytop 14 easily even in darkness or in a dim environment.

When keytop 14 is depressed, the press projection 45 of the rubber spring 44 passes through the first to third through-holes 71, 72 and 73, and presses the second sheet 31 of the membrane switch 15 downward. Thereby, the second sheet 31 bends and the movable contact 35 is pressed against the fixed contact 33, and the depression operation of the keytop 14 is electrically detected.

As a result, with a configuration in which the lightguide plate 52 is stacked on the membrane switch 15, the detection operation accompanied with the depression of the keytop 14 can be reliably performed.

The light-emitting diodes are not limited to ones arranged in the front-end part of a membrane sheet. The light-emitting diodes may be arranged in the rear end of the membrane sheet or placed to surround a region in which a contact is formed in the membrane sheet, for example.

In addition, in the above-described embodiment, the light-diffusing plate is stacked on the lightguide, but the invention is not limited thereto. The lightguide and the light-diffusing plate may be formed as an integral structure by forming a pattern that diffuses light on a surface of the lightguide, for example.

Furthermore, the light source of the lighting unit is not limited to the light-emitting diode. A fluorescent tube can be used, for example, in substitution for the light-emitting diode.

While certain embodiments of the inventions have been described, there embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A keyboard comprising:
   a substrate;
   a plurality of keytops arranged on the substrate, the keytops having optical transparency and liftably supported to the substrate;
   a membrane switch placed between the keytops and the substrate, the membrane switch having an electrically insulating membrane sheet on which a plurality of contacts operated by the keytops are formed;
   a light source mounted on the membrane sheet, the light source emitting light from an end part of the membrane sheet;
   a conductor pattern formed on the membrane sheet and configured to supply an electric current to the light source;
   a lightguide stacked on the membrane sheet the lightguide having an incident plane at an end facing the light source, and light from the light source incident on the incident plane passing through the lightguide; and
   a light-diffusing plate stacked on the lightguide, and through which light from the lightguide traveling toward the keytops penetrates, the light-diffusing plate having a light-diffusing part which diffuses light penetrating the lightguide across a wider range as the light travels away from the light source.

2. The keyboard of claim 1, wherein the lightguide includes a sheet-like main body having a size corresponding to that of an area on which the keytops are arranged, the light source includes a plurality of light-emitting diodes, and the light-emitting diodes are arranged at intervals along an outer peripheral part of the main body.

3. The keyboard of claim 2, wherein the light-emitting diodes are connected in series.

4. The keyboard of claim 2, wherein the lightguide is interposed between the substrate and the keytop membrane switch, and the membrane sheet of the membrane switch has optical transparency.

5. The keyboard of claim 4, wherein a light-reflecting plate configured to let light that passes through an inside of the lightguide reflect toward the keytops is interposed between the substrate and the lightguide.

6. The keyboard of claim 5, wherein the light-diffusing plate is interposed between the lightguide and the membrane switch.

7. The keyboard of claim 2, wherein the lightguide is stacked on the membrane switch.

8. An electronic apparatus comprising:
   a housing; and
   a keyboard supported by the housing, the keyboard includes:
   a substrate;
   a plurality of keytops arranged on the substrate, the keytops having optical transparency and liftably supported to the substrate;
   a membrane switch placed between the keytops and the substrate, the membrane switch having an electrically insulating membrane sheet on which a plurality of contacts operated by the keytops are formed;
   a light source mounted on the membrane sheet, the light source emitting light from an end part of the membrane sheet;
   a conductor pattern formed on the membrane sheet and configured to supply an electric current to the light source;
   a lightguide stacked on the membrane sheet, the lightguide having an incident plane at an end facing the light source, and light from the light source incident on the incident plane passing through the lightguide; and
   a light-diffusing plate stacked on the lightguide, and through which light from the lightguide traveling toward the keytops penetrates, the light-diffusing plate having a light-diffusing part which diffuses light penetrating the lightguide across a wider range as the light travels away from the light source.

* * * * *